United States Patent [19]

Shinomura

[11] Patent Number: 4,824,871

[45] Date of Patent: Apr. 25, 1989

[54] ELECTRICALLY CONDUCTIVE POLYMER COMPOSITE AND METHOD OF MAKING SAME

[75] Inventor: Toshihiko Shinomura, Tokyo, Japan

[73] Assignee: Inoue MTP Kabushiki Kaisya, Nagoya, Japan

[21] Appl. No.: 162,126

[22] Filed: Feb. 29, 1988

[30] Foreign Application Priority Data

Mar. 2, 1987 [JP] Japan ................... 62-45163

[51] Int. Cl.$^4$ ............................... C08J 9/36
[52] U.S. Cl. ........................ 521/53; 252/511; 252/512; 252/513; 252/514; 252/518; 521/54; 521/82; 521/92; 521/99; 521/123; 521/137; 521/138; 521/134; 521/139; 521/918
[58] Field of Search ............ 252/511, 512, 513, 514, 252/518; 521/53, 54, 82, 92, 99, 123

[56] References Cited

U.S. PATENT DOCUMENTS 4,171,410 10/1979 Frob ........................... 521/55
4,719,039 1/1988 Leonardi ..................... 252/511

Primary Examiner—Morton Foelak
Attorney, Agent, or Firm—Oblon, Fisher, Spivak, McClelland & Maier

[57] ABSTRACT

An electrically conductive polymer composite comprising a porous body of polymer A containing interconnected cavities, and polymer B containing an electrically conductive filler and filling the cavities of the porous body. This polymer composite can be made by filling the cavities of the porous body with a liquid monomer, monomer mixture or prepolymer and then polymerizing or cross-linking it to yield polymer B in solid form. The polymer composite has excellent mechanical properties and high electrical conductivity and, therefore, is suitable for use as an electrically conductive material, electromagnetic wave shielding material, heating element and antistatic material.

1 Claim, No Drawings

ELECTRICALLY CONDUCTIVE POLYMER COMPOSITE AND METHOD OF MAKING SAME

BACKGROUND OF THE INVENTION

1. Field of the Invention

This invention relates to a novel electrically conductive polymer composite and a method of making the same. This polymer composite is suitable for use as an electrically conductive material, electromagnetic wave shielding material, heating element, antistatic material and the like.

2. Description of the Prior Art

It is well known that an electrically conductive polymeric material can be obtained by incorporating an electrically conductive filler in a polymeric material.

Generally, a large amount of electrically conductive filler must be added in order to achieve satisfactorily high electrical conductivity. However, the addition of a large amount of electrically conductive filler is disadvantageous in that the resulting electrically conductive polymeric material tends to be poor in mechanical properties and moldability. Thus, it has been impossible to obtain an electrically conductive polymeric material having a desirable combination of properties.

SUMMARY OF THE INVENTION

It is an object of the present invention to provide an electrically conductive polymer composite having excellent mechanical properties and high electrical conductivity.

It is another object of the present invention to provide a method of making such an electrically conductive polymer composite.

According to the present invention, there is provided an electrically conductive polymer composite comprising (a) a porous body of polymer A containing interconnected cavities ranging in diameter from 0.05 $\mu$m to 10 mm and having a porosity of 5 to 95% by volume, and (b) polymer B containing 10 to 95% by weight of an electrically conductive filler and filling the cavities of said porous body.

According to the present invention, there is also provided a method of making an electrically conductive polymer composite which comprises the steps of (a) providing a porous body of polymer A containing interconnected cavities ranging in diameter from 0.05 $\mu$m to 10 mm and having a porosity of 5 to 95% by volume, (b) filling the cavities of said porous body with a liquid monomer, monomer mixture or prepolymer suitable for the formation of polymer B and containing 10 to 95% by weigh of an electrically conductive filler, and (c) polymerizing or cross-linking said liquid monomer, monomer mixture or prepolymer to yield polymer B in solid form.

DETAILED DESCRIPTION OF THE PREFERRED EMBODIMENTS

The electrically conductive polymer composite of the present invention comprises a porous body of polymer A containing interconnected cavities, and polymer B containing an electrically conductive filler and filling the cavities of the porous body. Although the phase of polymer A (porous body phase) in the polymer composite contains no electrically conductive filler and, therefore, lacks electrical conductivity, it has good mechanical properties such as strength and the like, and functions to maintain the strength and other mechanical properties desired for the polymer composite as a whole. On the other hand, the phase of polymer B formed so as to fill the cavities of the porous body is lower in strength and other mechanical properties, but has high electrical conductivity. Thus, the phase of polymer B functions to impart high electrical conductivity to the polymer composite as a whole.

As used herein, the expression "polymer B filling the cavities of the porous body" means the state of the porous body in which the cavities are substantially completely filled with polymer B (i.e., 70% by volume or more, preferably 90% by volume or more, of the cavities are filled with polymer B) and excludes the state of the porous body in which polymer B is attached only to the wall surfaces of the cavities or 30% by volume or more of the cavities are only partially filled with polymer B. If the cavities are incompletely filled with polymer B, a polymer composite having good mechanical properties (such as strength and the like) and high electrical conductivity will not be obtained and, therefore, the objects of the present invention will not be accomplished.

The porous body of polymer A used in the present invention may be made by any conventional method, provided that it contains interconnected cavities ranging in diameter from 0.05 $\mu$m to 10 mm and has a porosity of 5 to 95% by volume. For example, such porous bodies can be made by adding a blowing agent to polymer A and foaming the resulting mixture by the application of heat, or by adding a solid filler to polymer A, forming a sheet therefrom, and then stretching the sheet. Porous bodies containing non-interconnected cavities are not suitable for use in the present invention, because it is difficult to fill the cavities with polymer B. Even if the cavities can be filled with polymer B, the phase of polymer B is discontinuous and fails to provide high electrical conductivity. Though containing interconnected cavities, porous bodies in which most of the cavities have a diameter of less than 0.05 $\mu$m are unsuitable for use in the present invention, because it is difficult to fill the cavities with polymer B. On the other hand, porous bodies in which most of the cavities have a diameter of greater than 10 mm are also unsuitable, because the resulting polymer composite may have poor mechanical properties (such as strength and the like) and exhibit a nonuniform and coarse texture.

As used herein, the diameters of the cavities refer to the values measured by scanning electron microscopy.

The porous body of polymer A should have a porosity of 5 to 95% by volume. If the porosity of the porous body is less than 5% by volume, the amount of polymer B charged into the porous body will be too small to provide adequate electrical conductivity. Moreover, polymer B may not be uniformly introduced into the porous body, so that the electrical conductivity of the resulting polymer composite tends to be non-uniform. On the other hand, if the porosity is greater than 95% by volume, the strength and other mechanical properties of the polymer composite as a whole will be inadequate.

As polymer A constituting the aforesaid porous body, there may used any polymeric material selected from various thermoplastic resins, thermosetting resins, synthetic rubbers, natural rubber and the like. Specific examples thereof include polyethylene, polypropylene, polyvinyl chloride, polystyrene, polyethylene terephthalate, polybutylene terephthalate, polyamides, polyacetals, polycarbonates, polyphenylene oxides, methylpentene polymer, polyvinyl alcohol, polyalkylene oxides, polybutene, polyisobutylene, polysulfones, polyethersulfones, polyphenylene sulfides, polyarylates, polyetherimides, polyetherketones, polyimides, liquid crystal polymers, fluoroplastics, polyurethanes, unsaturated polyester resins, phenolic resins, ABS resins, polybutadiene rubber, SBR, polyisoprene, chloroprene rubber, NBR, butyl rubber, natural rubber and the like.

On the other hand, polymer B used in the electrically conductive polymer composite of the present invention may be any polymeric material selected from various polymers capable of being solidified by polymerizing a monomer (including an oligomer) or monomer mixture which is liquid at ordinary temperatures and various polymers capable of being cured by cross-linking a prepolymer which is liquid at ordinary temperatures. Specific examples thereof include polymethyl methacrylate, polystyrene, unsaturated polyesters, polyurethanes and the like. Although polymer B is usually different from polymer A, polymer B may be identical with polymer A.

The electrically conductive fillers which can be used in the present invention include, for example, carbon black, metal powders (such as gold, silver, copper, palladium, aluminum, iron, nickel, etc.), metallic oxide powders (tin oxide, zinc oxide, etc.) and the like. The electrically conductive filler used in the present invention should preferably have an average particle diameter ranging from about 0.01 μm to about 1 mm. The electrically conductive filler may also be a fibrous powder having an aspect ratio (length/diameter ratio) of 20 or less. Since the phase of polymer B governs the electrical conductivity of the polymer composite, it is desirable that a sufficient amount of the electrically conductive filler is present therein. More specifically, the content of the electrically conductive filler in the phase of polymer B should be in the range of 10 to 95% by weight.

The polymer composite of the present invention can be made according to the method described below.

To a liquid monomer, monomer mixture or prepolymer suitable for the formation of polymer B are added a predetermined amount (10 to 95% by weight) of an electrically conductive filler and, if necessary, a polymerization catalyst or cross-linking agent. These ingredients are intimately mixed to prepare an impregnating fluid. Then, a porous body of polymer A is nipped between rolls or evacuated with a vacuum pump to expel air from the cavities thereof. Thereafter, the cavities of the porous body of polymer A are filled with the impregnating fluid, for example, by soaking the porous body in the impregnating fluid or by injecting the impregnating fluid into the porous body. Then, the liquid monomer, monomer mixture or prepolymer is polymerized or cross-linked to yield polymer B in solid form. Although this polymerization or cross-linking is preferably carried out by the application of heat, there may be used other polymerizing or cross-linking techniques such as exposure to ultraviolet light, high-energy radiation, ultrasonic waves, microwaves and the like.

If desired, the electrically conductive polymer composite of the present invention may further contain various additives such as stabilizers, plasticizers, lubricants, flame retardants, surface active agents, fillers and the like.

Thus, the present invention provides a polymer composite having excellent mechanical properties and excellent electrical characteristics such as electrical conductivity and the like.

The present invention is further illustrated by the following examples.

COMPARATIVE EXAMPLE 1

70 parts by weight of polypropylene (with a melt index of 2) and 30 parts by weight of carbon black (with an average particle diameter of 0.03 μm) were charged into a kneader, melted at 180°–230° C., and kneaded for 10 minutes. The resulting compound was pressed at 250° C. to form a 30 mm×50 mm sheet having a thickness of 2 mm.

When electrical characteristics of the above sheet were evaluated, it was found that its volume resistivity had a relatively high value of 7.5 Ω-cm and its electromagnetic wave transmission loss (as measured by the pipe method at a frequency of 4.0 GHz) had a low value of 16 dB. Thus, this sheet was not suitable for use as an electrically conductive material or as an electromagnetic wave shielding material.

EXAMPLE 1

20 parts by weight of an unsaturated polyester (commercially available from Dainippon Ink Co., Ltd. under the trade name of FH-113) containing 1% by weight of methyl ethyl ketone peroxide as a polymerization initiator was mixed with 80 parts by weight of carbon black (with an average particle diameter of 30 μm) to prepare a fluid mixture. A foamed polyurethane sheet, which contained interconnected cavities of 0.1 to 9 mm diameter and had a porosity of about 77% by volume, was nipped between rolls to expel air from its cavities, soaked in the above fluid mixture, and then released from the rolls so as to restore the sheet to its expanded state and thereby impregnate it with the fluid mixture. The impregnated sheet was pressed at 60° C. for 20 minutes to cure the fluid mixture. Thus, there was obtained a 30 mm×50 mm sheet having a thickness of 2 mm.

When electrical characteristics of the above sheet were evaluated, it was found that, as shown in Table 1, its volume resistivity was low and its electromagnetic wave transmission loss was high. Thus, this sheet was highly suitable for use as an electrically conductive material and as an electromagnetic wave shielding material.

EXAMPLE 2

6 parts by weight of methyl methacrylate containing a polymerization catalyst was mixed with 94 parts by weight of copper powder (with an average particle diameter of 2 μm) to prepare a fluid mixture. A foamed polyethylene sheet, which contained interconnected cavities of 0.1 to 9 mm diameter and had a porosity of about 30% by volume, was nipped between rolls to expel air from its cavities, soaked in the above fluid mixture, and then released from the rolls to impregnate the sheet with the fluid mixture. The impregnated sheet was pressed at 120° C. for 30 minutes to cure the fluid mixture. Thus, there was obtained a 30 mm×50 mm sheet having a thickness of 2 mm.

When electrical characteristics of the above sheet were evaluated, it was found that, as shown in Table 1, its volume resistivity was low and its electromagnetic wave transmission loss was high. Thus, this sheet was highly suitable for use as an electrically conductive material and as an electromagnetic wave shielding material.

EXAMPLE 3

25 parts by weight of an equimolar mixture (liquid) of polyethylene glycol and toluylene diisocyanate was mixed with 75 parts by weight of aluminum powder (with an average particle diameter of 0.1 μm) and 0.1 part by weight of a polymerization catalyst (tin octoate) to prepare a fluid mixture. A foamed polypropylene sheet, which contained interconnected cavities of 0.1 to 100 μm diameter and had a porosity of 8% by volume, was evacuated with a vacuum pump to expel air from its cavities, and then soaked in the above fluid mixture to impregnate the sheet with the fluid mixture. The impregnated sheet was pressed at 80° C. for 10 minutes to cure the fluid mixture. Thus, there was obtained a 30 mm×50 mm sheet having a thickness of 2 mm.

When electrical characteristics of the above sheet were evaluated, it was found that, as shown in Table 1, its volume resistivity was low and its electromagnetic wave transmission loss was high. Thus, this sheet was highly suitable for use as an electrically conductive material and as an electromagnetic wave shielding material.

EXAMPLE 4

90 parts by weight of styrene monomer was mixed with 10 parts by weight of nickel powder (with an average particle diameter of 0.05 μm) to prepare a fluid mixture. A foamed SBR rubber sheet, which comprised a cross-linked product containing interconnected cavities of 0.1 to 100 μm diameter and having a porosity of about 30% by volume, was nipped between rolls to expel air from its cavities, soaked in the above fluid mixture, and then released from the rolls to impregnate the sheet with the fluid mixture. The impregnated sheet was pressed at 120° C. for 30 minutes to cure the fluid mixture. Thus, there was obtained a 30 mm×50 mm sheet having a thickness of 2 mm.

When electrical characteristics of the above sheet were evaluated, it was found that, as shown in Table 1, its volume resistivity was low and its electromagnetic wave transmission loss was high. Thus, this sheet was highly suitable for use as an electrically conductive material and as an electromagnetic wave shielding material.

EXAMPLE 5

5 parts by weight of an equimolar mixture (liquid) of polypropylene glycol and diphenylmethane diisocyanate was mixed with 95 parts by weight of iron powder (with an average particle diameter of 0.1 μm) and 0.1 part by weight of a polymerization catalyst (tin octoate) to prepare a fluid mixture. A foamed polystyrene sheet, which contained interconnected cavities of 1 to 800 μm diameter and had a porosity of 50% by volume, was nipped between rolls to expel air from its cavities, soaked in the above fluid mixture, and then released from the rolls to impregnate the sheet with the fluid mixture. The impregnated sheet was pressed at 80° C. for 10 minutes to cure the fluid mixture. Thus, there was obtained a 30 mm×50 mm sheet having a thickness of 2 mm.

When electrical characteristics of the above sheet were evaluated, it was found that, as shown in Table 1, its volume resistivity was low and its electromagnetic wave transmission loss was high. Thus, this sheet was highly suitable for use as an electrically conductive material and as an electromagnetic wave shielding material.

EXAMPLE 6

50 parts by weight of styrene monomer was mixed with 50 parts by weight of $SnO_2$ powder (with an average particle diameter of 5 μm) and 1 part by weight of benzoyl peroxide to prepare a fluid mixture. A foamed polyurethane sheet, which contained interconnected cavities of 15 to 900 μm diameter and had a porosity of about 70% by volume, was nipped between rolls to expel air from its cavities, soaked in the above fluid mixture, and then released from the rolls to impregnate the sheet with the fluid mixture. The impregnated sheet was pressed at 120° C. for 30 minutes to cure the fluid mixture. Thus, there was obtained a 30 mm×50 mm sheet having a thickness of 2 mm.

When electrical characteristics of the above sheet were evaluated, it was found that, as shown in Table 1, its volume resistivity was low and its electromagnetic wave transmission loss was high. Thus, this sheet was highly suitable for use as an electrically conductive material and as an electromagnetic wave shielding material.

TABLE 1

|  | Porous body of polymer A containing interconnected cavities | Polymer B | Weight ratio of A/B | Electrically conductive filler | | Volume resistivity (Ω-cm) | Electromagnetic wave transmission loss (dB) |
| --- | --- | --- | --- | --- | --- | --- | --- |
|  |  |  |  | Type | Content in B phase (% by weight) |  |  |
| Example 1 | Foamed polyurethane | Unsaturated polyester | 23/77 | Carbon black | 80 | 0.1 | over 50 |
| Example 2 | Foamed polyethylene | Polymethyl methacrylate | 72/28 | Copper powder | 94 | 0.05 | over 50 |
| Example 3 | Foamed polypropylene | Polyurethane | 92/8 | Aluminum powder | 75 | 0.3 | over 50 |
| Example 4 | Foamed SBR rubber | Polystyrene | 7/93 | Nickel powder | 10 | 0.2 | over 50 |
| Example 5 | Foamed polystyrene | Polyurethane | 50/50 | Iron power | 95 | 0.1 | over 50 |
| Example 6 | Foamed polyurethane | Polystyrene | 32/68 | $SnO_2$ powder | 50 | 0.1 | over 50 |

What is claimed is:

1. A method of making an electrically conductive polymer composite which comprises the steps of (a) providing a porous body of polymer A containing interconnected cavities ranging in diameter from 0.05 μm to 10 mm and having a porosity of 5 to 95% by volume, (b) filing the cavities of said porous body with a liquid monomer, monomer mixture or prepolymer suitable for the formation of polymer B and containing 10 to 95% by weight of an electrically conductive filler, and (c) polymerizing or cross-linking said liquid monomer, monomer mixture or prepolymer to yield polymer B in solid form.

* * * * *